(12) United States Patent
Craig et al.

(10) Patent No.: US 8,244,442 B2
(45) Date of Patent: Aug. 14, 2012

(54) SYSTEM AND METHOD FOR STABILITY CONTROL OF VEHICLE AND TRAILER

(75) Inventors: William C Craig, Endicott, NY (US);
Richard S Stevens, Endicott, NY (US);
Thomas D'Onofrio, Endicott, NY (US);
David Shivy, Endwell, NY (US);
Charles T Disaverio, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 576 days.

(21) Appl. No.: 12/372,627

(22) Filed: Feb. 17, 2009

(65) Prior Publication Data
US 2010/0211277 A1    Aug. 19, 2010

(51) Int. Cl.
*B60K 28/10* (2006.01)
*B60W 10/06* (2006.01)
*B60W 10/12* (2006.01)
*B60W 10/18* (2006.01)

(52) U.S. Cl. ......................................... 701/70; 701/48
(58) Field of Classification Search ........................ None
See application file for complete search history.

(56) References Cited

U.S. PATENT DOCUMENTS

| | | | |
|---|---|---|---|
| 4,072,850 A | 2/1978 | McGlynn | |
| 4,593,357 A | 6/1986 | Van Ostrand et al. | |
| 4,621,833 A | 11/1986 | Soltis | |
| 4,691,284 A | 9/1987 | Izumi et al. | |
| 4,843,557 A | 6/1989 | Ina et al. | |
| 4,882,693 A | 11/1989 | Yopp | |
| 4,922,427 A | 5/1990 | Yokote et al. | |
| 4,954,957 A | 9/1990 | Kawagoe et al. | |
| 5,037,119 A | 8/1991 | Takehara et al. | |
| 5,044,660 A | 9/1991 | Yamamura et al. | |
| 5,091,856 A | 2/1992 | Hasegawa et al. | |
| 5,123,497 A | 6/1992 | Yopp et al. | |
| 5,136,513 A | 8/1992 | Sol et al. | |
| 5,161,106 A | 11/1992 | Shiraishi et al. | |
| 5,183,127 A | 2/1993 | Kageyama et al. | |
| 5,255,193 A | 10/1993 | Katayose et al. | |
| 5,265,693 A | 11/1993 | Rees et al. | |
| 5,265,945 A | 11/1993 | Yamashita et al. | |
| 5,281,008 A | 1/1994 | Kawamura et al. | |

(Continued)

FOREIGN PATENT DOCUMENTS
CA    2370580    5/2003
(Continued)

OTHER PUBLICATIONS

Proceedings of the IEEE, vol. 88, No. 7, Jul. 2000, "Automotive Engine Control and Hybrid Systems: Challenges and Opportunities", pp. 888-912.

(Continued)

*Primary Examiner* — Michael J. Zanelli
(74) *Attorney, Agent, or Firm* — Slater & Matsil, L.L.P.

(57) ABSTRACT

A system and method for stability control of a vehicle and a trailer. The system and method can receive vehicle and trailer operating data or signals and define one of a brake-based stability control subsystem and a torque management-based stability control subsystem as the dominant stability control system. Based on the stability control subsystem defined as the dominant stability control system, the system and method provide stability control for the vehicle and the trailer.

20 Claims, 5 Drawing Sheets

U.S. PATENT DOCUMENTS

| | | |
|---|---|---|
| 5,366,041 A | 11/1994 | Shiraishi |
| 5,369,584 A | 11/1994 | Kajiwara |
| 5,400,265 A | 3/1995 | Kauppinen |
| 5,401,052 A | 3/1995 | Yoshioka et al. |
| 5,408,411 A | 4/1995 | Nakamura et al. |
| 5,469,356 A | 11/1995 | Hawkins et al. |
| 5,487,002 A | 1/1996 | Diller et al. |
| 5,513,107 A | 4/1996 | Gormley |
| 5,564,796 A | 10/1996 | Saito et al. |
| 5,632,503 A | 5/1997 | Raad et al. |
| 5,636,909 A | 6/1997 | Hirao et al. |
| 5,713,425 A | 2/1998 | Buschhaus et al. |
| 5,832,400 A | 11/1998 | Takahashi et al. |
| 5,906,560 A | 5/1999 | Minowa et al. |
| 5,906,645 A | 5/1999 | Kagawa et al. |
| 5,941,919 A | 8/1999 | Pastor et al. |
| 5,971,089 A | 10/1999 | Sawada |
| 5,995,895 A | 11/1999 | Watt et al. |
| 6,018,308 A | 1/2000 | Shirai |
| 6,038,500 A | 3/2000 | Weiss |
| 6,074,020 A | 6/2000 | Takahashi et al. |
| 6,092,014 A | 7/2000 | Okada |
| 6,097,316 A | 8/2000 | Liaw et al. |
| 6,098,005 A | 8/2000 | Tsukamoto et al. |
| 6,122,572 A | 9/2000 | Yavnai |
| 6,151,537 A | 11/2000 | Gheordunescu et al. |
| 6,151,549 A | 11/2000 | Andrews et al. |
| 6,154,688 A | 11/2000 | Dominke et al. |
| 6,155,365 A | 12/2000 | Boberg |
| 6,182,000 B1 | 1/2001 | Ohta et al. |
| 6,188,945 B1 | 2/2001 | Graf et al. |
| 6,199,001 B1 | 3/2001 | Ohta et al. |
| 6,199,003 B1 | 3/2001 | Hollingsworth et al. |
| 6,216,068 B1 | 4/2001 | Gimmler et al. |
| 6,226,581 B1 | 5/2001 | Reimann et al. |
| 6,236,923 B1 | 5/2001 | Corcoran et al. |
| 6,240,347 B1 | 5/2001 | Everhart et al. |
| 6,249,727 B1 | 6/2001 | Muller |
| 6,260,859 B1 | 7/2001 | Dixon |
| 6,278,929 B1 | 8/2001 | Tozu et al. |
| 6,381,524 B1 | 4/2002 | Kuragaki et al. |
| 6,421,593 B1 | 7/2002 | Kempen et al. |
| 6,424,900 B2 | 7/2002 | Murray et al. |
| 6,438,482 B1 | 8/2002 | Baumann et al. |
| 6,499,343 B1 | 12/2002 | Haas et al. |
| 6,681,180 B2 | 1/2004 | Bevly et al. |
| 6,704,622 B2 | 3/2004 | Tinskey et al. |
| 6,738,701 B2 | 5/2004 | Wilson |
| 6,816,764 B2 | 11/2004 | Coelingh et al. |
| 6,856,877 B2 | 2/2005 | Coelingh et al. |
| 6,873,891 B2 | 3/2005 | Moser et al. |
| 6,873,898 B1 | 3/2005 | Kostadina |
| 6,879,898 B2 | 4/2005 | Ghoneim et al. |
| 6,904,351 B1 | 6/2005 | Hac |
| 6,982,635 B2 | 1/2006 | Obradovich |
| 7,016,778 B1 | 3/2006 | Ehmer et al. |
| 7,083,025 B2 | 8/2006 | Bedner et al. |
| 7,092,808 B2 | 8/2006 | Lu et al. |
| 7,146,264 B2 | 12/2006 | Bates et al. |
| 7,162,333 B2 | 1/2007 | Koibuchi et al. |
| 7,162,343 B2 | 1/2007 | Subbian et al. |
| 7,162,346 B2 | 1/2007 | Berry et al. |
| 7,266,437 B2 | 9/2007 | Hrovat et al. |
| 7,276,014 B2 | 10/2007 | Goto et al. |
| 7,302,333 B2 | 11/2007 | Steen et al. |
| 7,302,837 B2 | 12/2007 | Wendte |
| 7,337,053 B2 | 2/2008 | Piyabongkarn et al. |
| 7,341,541 B2 | 3/2008 | Houtman et al. |
| 7,349,776 B2 | 3/2008 | Spillane et al. |
| 7,366,602 B2 | 4/2008 | Xu et al. |
| 7,373,227 B2 | 5/2008 | Lu et al. |
| 7,392,120 B2 | 6/2008 | Matsumoto et al. |
| 7,426,437 B2 | 9/2008 | Breed et al. |
| 7,444,222 B2 | 10/2008 | Villella et al. |
| 7,451,033 B2 | 11/2008 | Xu et al. |
| 7,798,263 B2 * | 9/2010 | Tandy et al. ............... 180/14.6 |
| 2001/0003805 A1 | 6/2001 | Koibuchi |
| 2002/0016659 A1 | 2/2002 | Tashiro et al. |
| 2002/0099484 A1 | 7/2002 | Kuragaki et al. |
| 2002/0116101 A1 | 8/2002 | Hashiba et al. |
| 2003/0120395 A1 | 6/2003 | Kacel |
| 2003/0171865 A1 | 9/2003 | Moser et al. |
| 2003/0182026 A1 | 9/2003 | Awada et al. |
| 2003/0191568 A1 | 10/2003 | Breed |
| 2003/0195666 A1 | 10/2003 | Mactavish et al. |
| 2003/0200016 A1 | 10/2003 | Spillane et al. |
| 2003/0225494 A1 | 12/2003 | Coelingh et al. |
| 2003/0225495 A1 | 12/2003 | Coelingh et al. |
| 2003/0225496 A1 | 12/2003 | Coelingh et al. |
| 2004/0044443 A1 | 3/2004 | Eriksson |
| 2004/0044448 A1 | 3/2004 | Ramaswamy et al. |
| 2004/0193352 A1 | 9/2004 | Ito et al. |
| 2004/0193363 A1 | 9/2004 | Schmidt et al. |
| 2004/0249533 A1 | 12/2004 | Wheals et al. |
| 2004/0267427 A1 | 12/2004 | Suzuki et al. |
| 2005/0004732 A1 | 1/2005 | Berry et al. |
| 2005/0021205 A1 | 1/2005 | Niwa et al. |
| 2005/0043872 A1 | 2/2005 | Heyn |
| 2005/0080528 A1 | 4/2005 | Obradovich |
| 2005/0080546 A1 | 4/2005 | Milot |
| 2005/0096799 A1 | 5/2005 | Boswell et al. |
| 2005/0114007 A1 | 5/2005 | Pillar et al. |
| 2005/0149263 A1 | 7/2005 | Chow |
| 2005/0165886 A1 | 7/2005 | Tuer et al. |
| 2005/0177287 A1 | 8/2005 | Wang et al. |
| 2005/0203684 A1 | 9/2005 | Borgesson |
| 2005/0206234 A1 | 9/2005 | Tseng et al. |
| 2005/0209742 A1 | 9/2005 | Sakakibara et al. |
| 2006/0015231 A1 | 1/2006 | Yoshimura et al. |
| 2006/0041360 A1 | 2/2006 | Post, II |
| 2006/0074530 A1 | 4/2006 | Meyers et al. |
| 2006/0076828 A1 | 4/2006 | Lu et al. |
| 2006/0100062 A1 | 5/2006 | Goto et al. |
| 2006/0214506 A1 | 9/2006 | Albright et al. |
| 2007/0032913 A1 | 2/2007 | Ghoneim et al. |
| 2007/0050112 A1* | 3/2007 | Kroehnert et al. ............... 701/41 |
| 2007/0067085 A1 | 3/2007 | Lu et al. |
| 2007/0118263 A1 | 5/2007 | Nelson |
| 2007/0184929 A1 | 8/2007 | Piyabongkarn et al. |
| 2007/0244620 A1 | 10/2007 | Drenth |
| 2007/0257549 A1* | 11/2007 | Tandy et al. ..................... 303/7 |
| 2007/0265758 A1 | 11/2007 | Miura |
| 2007/0294016 A1 | 12/2007 | Braun et al. |
| 2008/0040005 A1 | 2/2008 | Breed |
| 2008/0082234 A1 | 4/2008 | Majersik et al. |
| 2008/0183353 A1 | 7/2008 | Post et al. |
| 2008/0215223 A1 | 9/2008 | Yamada et al. |
| 2008/0243335 A1 | 10/2008 | Rao et al. |
| 2008/0243336 A1 | 10/2008 | Fitzgibbons |
| 2009/0143936 A1 | 6/2009 | Craig |
| 2009/0143937 A1 | 6/2009 | Craig |
| 2009/0150036 A1 | 6/2009 | Craig |
| 2010/0211248 A1 | 8/2010 | Craig et al. |
| 2010/0211278 A1 | 8/2010 | Craig et al. |

FOREIGN PATENT DOCUMENTS

| | | |
|---|---|---|
| DE | 4416991 A1 | 11/1995 |
| DE | 19904216 A1 | 1/2000 |
| DE | 10209884 | 3/2003 |
| EP | 0563845 A1 | 10/1993 |
| EP | 0832770 A2 | 4/1998 |
| EP | 0 922 618 A2 | 6/1999 |
| EP | 0 978 435 A2 | 2/2000 |
| EP | 1028011 A2 | 8/2000 |
| EP | 1 355 209 A1 | 10/2003 |
| EP | 1574368 A1 | 9/2005 |
| FR | 2796 893 | 2/2001 |
| GB | 2357159 A | 6/2001 |
| JP | 4103436 | 4/1992 |
| JP | 04238745 | 8/1992 |
| JP | 06-219187 | 8/1994 |
| JP | 06-219191 | 8/1994 |
| JP | 2004080066 A | 3/2004 |
| WO | WO 95/31638 | 11/1995 |
| WO | WO 01/54940 A1 | 8/2001 |

| | | |
|---|---|---|
| WO | WO 03/044609 | 5/2003 |
| WO | WO 03/067844 | 8/2003 |
| WO | WO 2004106102 A1 | 12/2004 |

OTHER PUBLICATIONS

Integrated Manufacturing Systems, vol. 5 No. 4/5, 1994, pp. 5-12 "An Exploration of Concepts in System Integration".

Industrial Robot, vol. 4, No. 5, 1997, pp. 364-369, "Automating Agricultural Vehicles".

Electronics Times, Mar. 26, 2001, "ECUs Used to Win Control".

JSAE Review 22 (2001), pp. 453-461, "Coordinated Control of a Mechanical Hybrid Driveline with a Continuously Variable Transmission", Shiwen Shen et al.

International Search Report and Written Opinion of the International Searching Authority dated May 29, 2008, International Application No. PCT/US 07/11203 filed May 9, 2007.

Nonfinal Office Action dated Dec. 18, 2008, in U.S. Appl. No. 11/798,018.

Notice of Allowance dated Apr. 1, 2009, in U.S. Appl. No. 11/798,018.

Supplementary European Search Report dated Jan. 22, 2010, European Application No. 07867109.6.

U.S. Appl. No. 12/372,472, filed Feb. 17, 2009, entitled "Independent Suspension Air Spring Rod for Stability Spring Rate".

Nonfinal Office Action dated Mar. 10, 2010 in U.S. Appl. No. 11/987,769.

Final Office Action dated Mar. 12, 2010 in U.S. Appl. No. 11/987,862.

Canadian Office Action dated Jul. 9, 2010, in Canadian Application No. 2,651,252.

Election Requirement dated Nov. 8, 2010, in U.S. Appl. No. 12/372,472.

Nonfinal Office Action dated Jun. 3, 2009, in U.S. Appl. No. 11/987,862.

Final Office Action dated Nov. 10, 2010, in U.S. Appl. No. 11/987,769.

* cited by examiner

SYSTEM AND METHOD FOR STABILITY CONTROL OF VEHICLE AND TRAILER

The present invention relates generally to vehicle control, and, more particularly, to systems and methods for vehicle and trailer stability control.

DETAILED DESCRIPTION

In one aspect, an exemplary embodiment of the present invention relates to a method for stability control of a wheeled vehicle and a trailer coupled thereto. The method can comprise receiving at a controller, data associated with current vehicle operating conditions; receiving at the controller, data associated with current trailer operating conditions; providing a plurality of stability control subsystems for the wheeled vehicle, the plurality including at least a brake-based stability control subsystem and a torque management-based stability control subsystem; responsive to said received data associated with current vehicle operating conditions and said received data associated with current trailer operating conditions, automatically selecting one of the plurality as dominant; and providing stability control of the wheeled vehicle and the trailer using the automatically chosen dominant stability control system.

In another aspect, an exemplary embodiment of the present invention relates to a system for stability control of a tactical vehicle and a trailer physically and electrically coupled thereto. The system can comprise first receiving means for receiving three or more of a velocity signal of the tactical vehicle, speed signals from each wheel of the tactical vehicle, a height signal associated with the tactical vehicle, a steering signal associated with the tactical vehicle, a throttle signal associated with the tactical vehicle, a roll/pitch/yaw signal associated with the tactical vehicle, a brake pedal signal, an active damping signal, and at least one signal associated with a current driving condition of the tactical vehicle; second receiving means for receiving a signal from a traction control system, the signal from the traction control system being indicative of a traction mode of the tactical vehicle selected by a user; third receiving means for receiving three or more of a wheel speed of the trailer, a velocity signal of the trailer, a height signal of the trailer, a roll/pitch/yaw signal of the trailer, a trailer tongue angle, and at least one signal associated with current driving condition of the trailer; processing means for defining one of a brake-based stability control subsystem and a torque management-based stability control subsystem as the dominant stability control system of the tactical vehicle based on the signals received by said first, second, and third receiving means; and controlling means for providing stability control of the tactical vehicle and of the trailer based on the defined dominant stability control system.

In another aspect, an exemplary embodiment of the present invention can include a method for electronic stability control of a wheeled tactical vehicle and a trailer coupled to the wheeled tactical vehicle. The electronic stability control method can comprise receiving substantially in real time at a state estimator of a vehicle arbiter controller, signals associated with current vehicle operating conditions, wherein the current vehicle operating conditions signals can include three or more of a wheel speed signal, a velocity signal, a height signal, a steering signal, a throttle signal, a roll/pitch/yaw signal, an acceleration signal, a brake pedal signal, and an active damper signal. The method also can comprise receiving substantially in real time at the state estimator of the vehicle arbiter controller, signals associated with current trailer operating conditions, wherein the current trailer operating conditions signals can include three or more of a wheel speed signal, a velocity signal, a height signal, a roll/pitch/yaw signal, and a tongue angle signal. The method can further comprise receiving at the state estimator of the vehicle arbiter controller a signal associated with a mobility traction control system including a mobility keypad, wherein the signal from the mobility traction control system can be indicative of a traction mode of the wheeled tactical vehicle selected by a user via the mobility keypad. The method also can comprise providing a brake-based stability control subsystem, a torque-based stability control subsystem, and a drivetrain-based stability control subsystem; selecting one of the brake-based stability control subsystem, the torque-based stability control subsystem, and the drivetrain-based stability control subsystem as the dominant stability control system for the wheeled tactical vehicle based on the three or more received signals associated with current vehicle operating conditions, the three or more received signals associated with current trailer operating conditions, and the received signal associated with the mobility traction control system; and providing stability control of the wheeled tactical vehicle and for the trailer coupled to the wheeled tactical vehicle based on the selected dominant stability control subsystem, while disabling the stability control subsystems not selected as dominant.

Generally speaking, the present invention can involve a system and method that use a control system arbiter (controller) to define what major subsystem has dominant control of vehicle stability given parameters of the vehicle's current operating conditions. The vehicle operating conditions can include a vehicle speed or velocity, a wheel speed, including a difference in wheel speed, a vehicle height, current driving conditions, steering wheel position, throttle pedal position, a brake position or force applied thereto, and vehicle yaw rate and lateral position. From the vehicle's operating conditions, the system and method can determine which stability control system will be the dominant system in control. In various embodiments, the system and method can consider a brake-based stability subsystem and a driveline torque-based stability subsystem as the dominant subsystem in control. Optionally, embodiments of the present invention can also include for consideration as the dominant stability control system a brake-based stability control subsystem, a torque-based stability control subsystem, and a drivetrain-based stability control subsystem. Stability control for the vehicle may be provided such that the other or others of the non-selected stability control subsystems are partly or entirely disabled. For example, when the brake-based stability subsystem is selected as the dominant stability subsystem, the driveline torque-based stability subsystem may be disabled (partly or entirely) from operating. Thus, in various embodiments of the present invention, only one dominant stability system may be "on," operational, or have control at one time.

Some or all of the aforementioned operating conditions can be read or monitored in real time or substantially real time. Furthermore, the system and method according to various embodiments of the invention can determine which stability control subsystem is dominant if the vehicle's stability control system (SCS) is invoked. Optionally, the system and method can choose, determine, or define one or more subordinate subsystems based on the dominant stability control subsystem and/or vehicle operating conditions, and/or based on other suitable inputs, such as GPS data, weather data, or input from a mobility keypad.

In general, a brake-based stability control system may include use of an electronic stability control algorithm to apply variable braking to all or some of the wheels in order to correct an unstable driving condition. Generally, a torque-based stability control system may automatically adjust (increase or decrease) the torque that is supplied to one or more wheels to correct an unstable driving condition. Finally, generally speaking, a drivetrain-based stability control system may automatically adjust (increase or decrease) the torque distribution to the wheels of the vehicle to correct an unstable driving condition. Note that in various embodiments of the present invention, torque can be supplied from a vehicle engine or motor to one or more vehicle differentials, and a control system may decide how much torque to apply to the one or more vehicle differentials. In various embodiments, feedback from system sensors, such as a steering angle sensor, a wheel speed sensor, and a lateral and yaw sensor may be used to decide how much torque to apply. Though not exclusively, a An unstable condition can be any unstable or unwanted condition of the vehicle. For example, an unstable condition may include one or more of a rollover condition, a wheel slip condition, an overspeed condition, a vibration condition, a braking condition, an oversteering condition, a loss of traction condition, etc.

Figure 1:
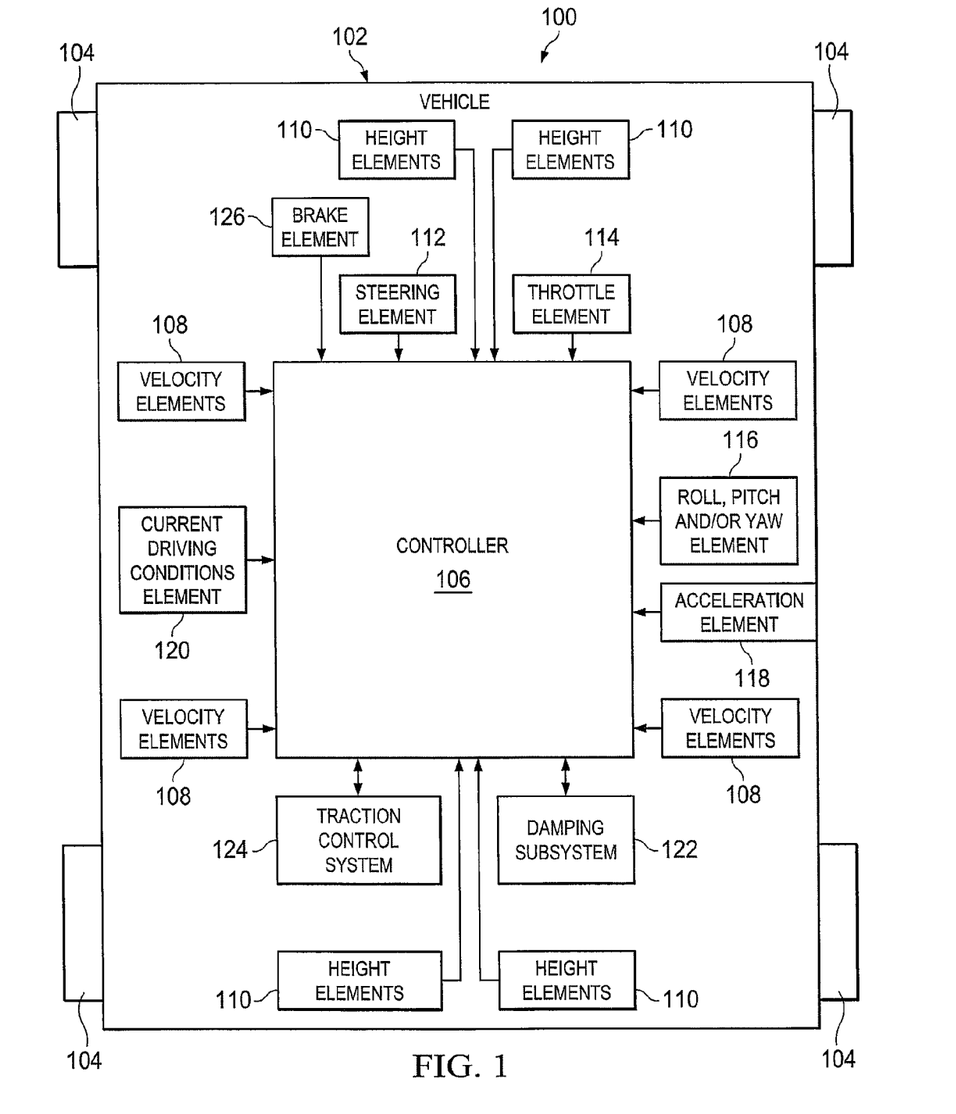
FIG. 1 is a block diagram illustration of an exemplary embodiment of a system in accordance with the present invention.

FIG. 1 shows a block diagram of a system 100 according to various embodiments of the present invention. System 100 may be configured in any suitable mobile vehicle 102. Mobile vehicle 102 can be any suitable vehicle, such as a car, a truck, a trailer, a tactical vehicle, a flatbed truck adapted to receive different shelters or modules on its bed, a wheeled Human Mobility Vehicle (HMV), a Joint Light Tactical or Technology Vehicle (JLTV), etc. Moreover, vehicle 102 can be manned or unmanned and may be configured to traverse any suitable terrain, including, but not limited to "on road" surfaces, "off-road" surfaces (e.g., non-paved, severe grade, severe slide slope, altitude, snow, ice, etc.), water, etc.

Vehicle 102 can have any suitable means for traversing. For example, vehicle 102 can have as a traversing means a wheeled system, a track system, a runner system, or the like. Moreover, vehicle 102 may include more than one traversing system or combination of traversing systems 104. The vehicle 102 in FIG. 1, for example, employs a wheel-based traversing system. FIG. 1 shows four wheels 104 being implemented, for example, but it will be appreciated that any suitable number of wheels can be implemented, such as four wheels or six wheels, without limitation. Vehicle 102 also can any suitable number of axles. Additionally, motive power for vehicle 102 can be provided by any suitable means, including, but not limited to, a combustion engine, an electric motor, a hybrid motor, etc. (motive power means not explicitly shown in FIG. 1). Further, vehicle 102 may include any suitable drive train (not shown), including, but not limited to, front wheel drive, rear wheel driver, four-wheel driver, all wheel drive, etc. Note that the representation of vehicle 102 shown in FIG. 1 is a simplified representation and that many features are not explicitly shown, such as an engine, motor(s), drive shaft, axles, wheel hubs, transmission (e.g., automatic or standard), transfer case, generator, steering wheel, differential(s), accelerator pedal, brake pedal, battery, various controllers (e.g., ECUs), buses (e.g., J1939, J1587), etc. Also note that some or all of the foregoing list of items may be optional for various embodiments of the present invention. For example, an electric vehicle may not have a combustion engine.

The system 100 shown in FIG. 1 and implemented in vehicle 102 can be for stability control of vehicle 102. Furthermore, system 100 can be for electronic stability control of vehicle 102.

System 100 can include any suitable subsystems, elements, and/or components. FIG. 1, for example shows system 100 including a controller 106; a plurality of speed or velocity elements 108; a plurality of height elements 110; a steering element 112; a throttle element 114; a roll, pitch, and/or yaw element 116; an acceleration element 118; a brake element 126. Optionally, system 100 can include subsystems and/or elements associated with current driving conditions of the vehicle. In FIG. 1, item 120 generally represents one or more of the subsystems and/or elements associated with current driving conditions of the vehicle 102. Optionally, vehicle 102 can include a damping subsystem 122, such as an active damper subsystem. In various embodiments, the damping subsystem 122 can be part of the stability control system 100. Optionally, system 100 can include a traction control subsystem 124.

The system's 100 speed or velocity element 108 can be any suitable element for reading, measuring, sensing, or otherwise determining a speed or velocity associated with vehicle 102. For example, element 108 can include wheel speed sensors, tachometers, hall effect sensors, photosensors, magnetic sensors, a speed sensor mounted on the output shaft of transmission, GPS sensor, etc. element 108 also may be configured to determine a wheel speed difference between some or all of the vehicles. Additionally, note that although FIG. 1 shows four speed or velocity elements 108, there can be any suitable number of elements, including zero, one, two, etc., depending upon the actual speed or velocity element(s) 108 used and/or the purpose or function thereof. In various embodiments, element(s) 108 can transmit or output data or one or more signals representative of speed or velocity. Optionally, the data or one or more signals can be transmitted or outputted to controller 106, either directly or via another means, such as a converting means and/or an amplification means. Moreover, in various embodiments, the data or one or more signals can be transmitted in real time or substantially real time.

The system's 100 height element 110 can be any suitable element or elements. In various embodiments, height element 110 may be a vehicle ride height element and can be configured to read, measure, sense, or otherwise determine a ride height of the vehicle. Additionally, note that although FIG. 1 shows four height elements 110, there can be any suitable number of elements, including zero, one, two, etc., depending upon the actual height element(s) 110 and/or the purpose or function thereof. In various embodiments, height element(s) 110 can transmit or output data or one or more signals representative of a vehicle height. Furthermore, in various embodiments, the vehicle's height may be adjustable. Optionally, the data or one or more signals can be transmitted or outputted to controller 106, either directly or via another means, such as a converting means and/or an amplification means. Moreover, in various embodiments, the data or one or more signals can be transmitted in real time or substantially real time. One or more height elements 110 can be part of a ride height subsystem. In various embodiments, the ride height subsystem also can include a controller (not shown). Optionally, the ride height controller can be part of controller 106 and/or dedicated to the ride height subsystem.

Steering element 112 can be any suitable element configured to read, measure, sense, or otherwise determine vehicle conditions associated with a vehicle's 102 steering wheel. For example, steering element 112 may be a steering wheel position sensor. In various embodiments, the steering element 112 can sense an angle of the steering wheel, a turning velocity of the steering wheel, a turning acceleration of the steering wheel, etc. In various embodiments, steering element 112 can transmit or output data or one or more signals representative of vehicle conditions associated with the vehicle's 102 steering wheel. Optionally, the data or one or more signals can be transmitted or outputted to controller 106, either directly or via another means, such as a converting means and/or an amplification means. Moreover, in various embodiments, the data or one or more signals can be transmitted in real time or substantially real time.

Throttle element 114 can be any suitable element configured to read, measure, sense, or otherwise determine vehicle conditions associated with vehicle's 102 throttle. In various embodiments, throttle element 114 can be associated with an engine of the vehicle or with an accelerator pedal position. For example, throttle element 114 can be an engine throttle position sensor, or, optionally, throttle element 114 can be an accelerator pedal position sensor. Though not explicitly shown, the system 100 can include both an engine throttle position sensor and an accelerator pedal position sensor. In various embodiments, throttle element 114 can transmit or output data or one or more signals representative of vehicle conditions associated with one or more of the above-noted throttle systems. Optionally, the data or one or more signals can be transmitted or outputted to controller 106, either directly or via another means, such as a converting means and/or an amplification means. Moreover, in various embodiments, the data or one or more signals can be transmitted in real time or substantially real time.

Roll, pitch, and/or yaw element 116 can be any suitable element configured to read, measure, sense, or otherwise determine vehicle conditions associated with vehicle's 102 roll, pitch, and/or yaw. In various embodiments, throttle element 114 can transmit or output data or one or more signals representative of vehicle conditions associated with one or more of the above-noted roll, pitch, or yaw determination. Optionally, the data or one or more signals can be transmitted or outputted to controller 106, either directly or via another means, such as a converting means and/or an amplification means. Moreover, in various embodiments, the data or one or more signals can be transmitted in real time or substantially real time. Optionally, element 116 can send one signal representative of roll, pitch, and yaw, or three separate signals representative of roll, pitch, and yaw, respectively. In various embodiments, roll, pitch, and yaw element 116 may be part of an Inertial Measurement Unit (IMU). Optionally, the IMU may be part of a stability control system module (SCS), which also may include a state estimator (to be described later).

Acceleration element 118 can be any suitable element configured to read, measure, sense, or otherwise determine vehicle conditions associated with the vehicle's 102 acceleration. For example, acceleration element 118 can be an accelerometer. In various embodiments, acceleration element 118 can transmit or output data or one or more signals representative of vehicle conditions associated with the vehicle's acceleration (e.g., Ax, Ay, and Az signals). Optionally, the data or one or more signals can be transmitted or outputted to controller 106, either directly or via another means, such as a converting means and/or an amplification means. Moreover, in various embodiments, the data or one or more signals can be transmitted in real time or substantially real time. In various embodiments, acceleration element 118 may be part of the Inertial Measurement Unit (IMU).

Brake element 126 can be any suitable element configured to read, measure, sense, or otherwise determine vehicle conditions associated with the vehicle's brake. For example, brake element 126 can determine an on/off condition of the brake, or can determine a force applied to the vehicle's brake pedal. Brake element 126 also may be configured to determine a distance of travel of or a distance to travel of the brake pedal. In various embodiments, brake element 126 can transmit or output data or one or more signals representative of vehicle conditions associated with the vehicle's brake system or brake pedal. Optionally, the data or one or more signals can be transmitted or outputted to controller 106, either directly or via another means, such as a converting means and/or an amplification means. Moreover, in various embodiments, the data or one or more signals can be transmitted in real time or substantially real time.

As noted above, item 120 generally represents one or more of the subsystems and/or elements associated with current driving conditions. Item 120 can be representative of any suitable subsystem and/or element. For example, item 120 can represent a subsystem or element to read, measure, sense, or otherwise determine a weight of the vehicle. Optionally, item 120 can represent a subsystem or element to read, measure, sense, or otherwise determine a vehicle center of gravity. Optionally, item 120 can represent a subsystem or element to read, measure, sense, or otherwise determine a surface upon which the vehicle is arranged, traversing, or riding (e.g., ice, snow, pavement, dirt, mud). Optionally, item 120 can represent a subsystem or element to read, measure, sense, or otherwise determine a slope of the vehicle. Note that the foregoing examples are not meant to limit the scope of subsystems or elements associated with current driving conditions of the vehicle 102. Furthermore, some or all of the aforementioned examples may be independent from each other and can be implemented in system 100 in any suitable configuration, combination, or omission of subsystems or elements. Also note that a global positioning system (GPS) element and/or a weather element and their respective outputs may also be considered as current driving conditions signals according to various embodiments of the present invention.

In various embodiments, each item 120 optionally implemented in system 100 can transmit or output data or one or more signals representative of associated current driving conditions of the vehicle. Optionally, the data or one or more signals can be transmitted or outputted to controller 106, either directly or via another means, such as a converting means and/or an amplification means. Moreover, in various embodiments, the data or one or more signals can be transmitted in real time or substantially real time. Optionally, some or all of the data or signals may not be transmitted in real time or substantially real time.

Optionally, system 100 can include traction control subsystem 124. traction control subsystem can be any suitable traction control subsystem. In various embodiments, traction control subsystem 124 can be the mobility traction control system of U.S. patent application Ser. No. 11/798,018 filed May 9, 2007 and entitled "MOBILITY TRACTION CONTROL SYSTEM AND METHOD." The entire content of the foregoing application is hereby incorporated by reference into the present application. Traction control subsystem 124 can transmit or output data or one or more signals representative of a traction mode of the vehicle 102. Optionally, the traction mode can be selected by a user by any suitable means. In various embodiments, the traction mode can be selected by a user using a mobility keypad.

Controller 106 can be any suitable controller. In various embodiments, controller 106 can comprise mode control logic including a plurality of programmable hardware components. Alternatively, controller 106 can comprise a processor such as, but not limited to, a microprocessor, microcontroller, a microcomputer, etc., or substantially as described below, or in the closing paragraphs. The controller 106 can execute a sequence of programmed instructions. The instructions can be compiled from source code instructions provided in accordance with a programming language such as C++. The instructions can also comprise code and data objects provided in accordance with, for example, the Visual Basic™ language, or another object-oriented programming language. In various embodiments, controller 106 may comprise an Application Specific Integrated Circuit (ASIC) including hard-wired circuitry designed to perform traction and/or ride control operations described herein. In various embodiments, controller 106 can be an arbiter controller, such as a Stability Control System (SCS) Arbitrator.

Controller 106 may be configured to receive or collect data or signals from sensors associated with one or more vehicle subsystems or sensors. Moreover, controller 106 can be configured to receive or collect data or signals directly from one or more vehicle subsystems or sensors. For example, controller 106 may receive or collect data or signals directly from an electronic control unit (ECU) associated with one or more of the vehicle subsystems or sensors.

Optionally, controller 106 can be configured to receive a plurality of data or signals representing current vehicle operating conditions. Examples of current vehicle operating conditions signals (or data) can include a speed or velocity signal, a wheel speed signal, a height signal, a steering signal, a throttle signal, a roll/pitch/yaw signal, an acceleration signal, a brake pedal signal, and one or more current driving conditions signals. Another example includes a damping signal. When implemented with a trailer, another example of an operating condition may be a trailer tongue angle. The one or more current driving conditions can be any suitable driving conditions of the vehicle 102. For example, the one or more current driving conditions can represent a weight of the vehicle 102, a vehicle center of gravity, a surface upon which the vehicle 102 is arranged, traversing, or riding (e.g., ice, snow, pavement, dirt, mud), and/or a slope of the vehicle 102. Current driving conditions also may be GPS data or weather data indicative of a vehicle's real-time location or position, for example. As will be described later, the GPS data and thus the GPS signal output can be correlated to a terrain map corresponding to the vehicle's real-time location. Furthermore, weather data and thus the weather signal output can be correlated to the GPS data corresponding to the vehicle's real-time position or location.

Optionally, controller 106 can be configured to receive data or a signal from a traction control system 124. In various embodiments, traction control system 124 can include a mobility keypad, and a user can manually input a desired traction mode. The signal or data from the traction control system 124 can be indicative of a traction mode of the wheeled tactical vehicle selected by a user via the mobility keypad.

Optionally, controller 106 can be configured to define, choose, or select as the dominant stability system, one of a brake-based stability control subsystem, a torque-based stability control subsystem, and a drivetrain-based stability control subsystem for the vehicle 102. Controller 106 also may be configured to define, choose, or select one or more subordinate subsystems. Furthermore, in various embodiments, the defining, choosing, or selecting may be based on received signals associated with current vehicle operating conditions. Optionally, the defining, choosing, or selecting may be based on the received signal or data associated with the traction control system 124. Furthermore, in various embodiments, the defining, choosing, or selecting may be based on GPS data or signals. Optionally, the defining, choosing, or selecting may be based on weather data.

Alternatively, in various embodiments, controller 106 can be configured to define, choose, or select as the dominant stability system, one of the brake-based stability control subsystem and a torque management-based stability control subsystem for the vehicle 102. Controller 106 also may be configured to define, choose, or select one or more subordinate subsystems. As with above, the defining, choosing, or selecting may be based on received signals associated with current vehicle operating conditions. Furthermore, optionally, the defining, choosing, or selecting may be based on the received signal or data associated with the traction control system 124, based on GPS data or signals, or based on weather data or signals. In various embodiments, controller 106 can include a state estimator, and the state estimator can be configured to perform the defining, choosing, or selecting of the dominant stability control system. In various embodiments, the state estimator can receive the signals or data associated with current vehicle operating conditions. Optionally, state estimator can receive the signal or data associated with the traction control system 124.

Controller 106 also can be configured to provide stability control for the vehicle 102. In various embodiments, controller 106 may provide stability control for vehicle 102 based on the defined, chosen, or selected dominant stability control system. Optionally, providing stability control also may include providing active damping using damping subsystem 122, for example. Optionally, controller 106 can include or provide an arbitration function, and the arbitration function can be configured to provide stability control for the vehicle 102. For example, the arbitration function may output to one or more vehicle systems or subsystems, intervention actions to be performed by the various systems or subsystems to maintain or regain stability. In various embodiments, the arbitration function may receive as inputs, outputs from the state estimator. The arbitration function also may provide outputs to various elements or control modules associated with certain subsystems to provide stability control. In various embodiments, signals may be output to one or more vehicle subsystems via a J1939 bus. Various vehicle subsystems may include an engine control module, a brake controller, a torque controller, a shock controller, a height controller, a differential controller, etc.

Note that some or all of the subsystems, elements and/or components shown and described with respect to FIG. 1 may be optional. Also note that subsystems, elements, and components and configuration and arrangement thereof shown in FIG. 1 are merely illustrative, and the system 100 can have any suitable configuration and/or arrangement of subsystems, components, and elements, as well as any suitable combination.

Figure 2:
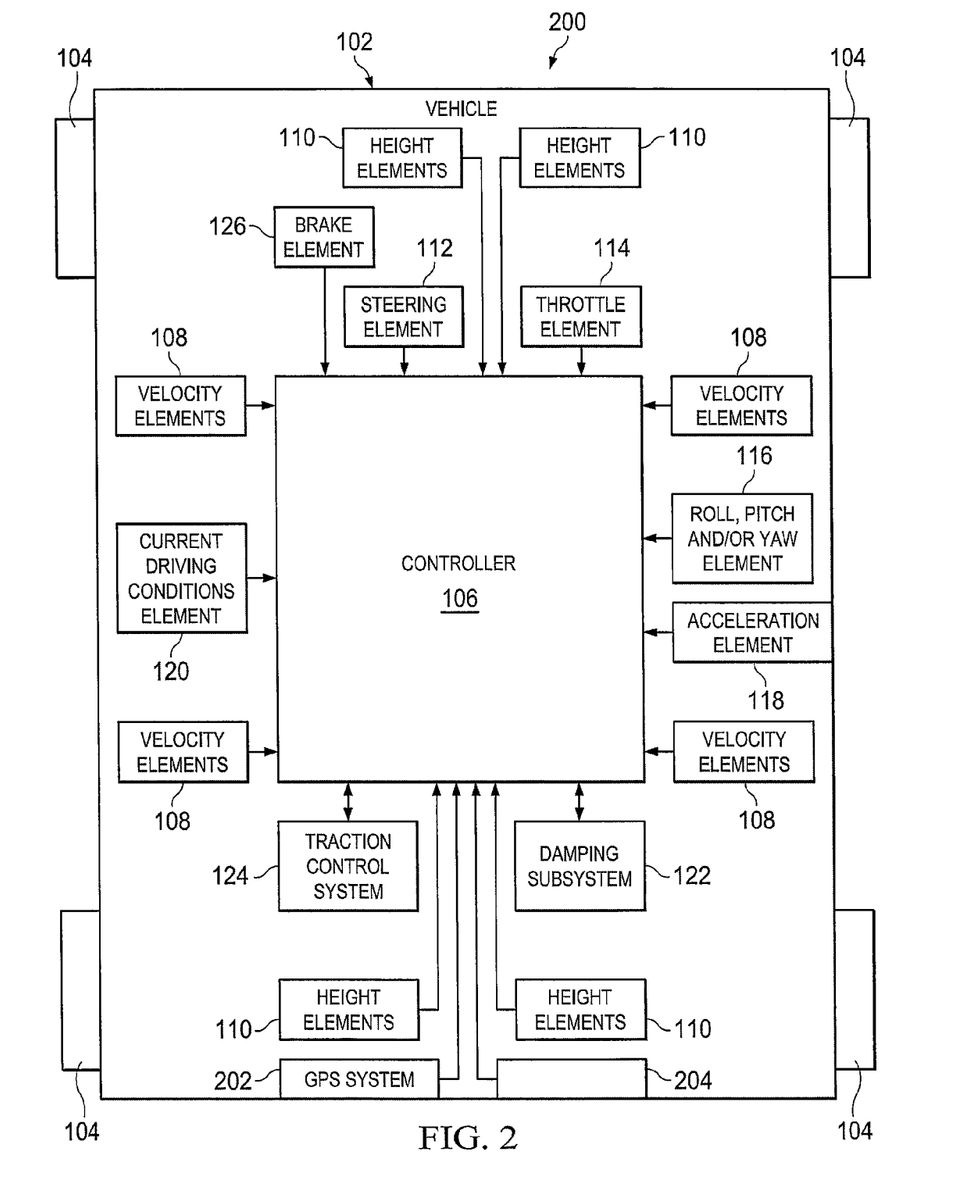
FIG. 2 is a block diagram illustration of an exemplary embodiment of a system in accordance with the present invention.

Turning now to FIG. 2, FIG. 2 shows a block diagram of a system 200 according to various embodiments of the present invention. System 200 and vehicle 102 are substantially the same as the system 100 and vehicle 102 shown in FIG. 1. However, the system 200 shown in FIG. 2 additionally includes global positioning system (GPS) subsystem 202.

GPS subsystem 202 can be of any suitable configuration. In various embodiments, GPS subsystem 202 can be configured substantially as described in U.S. patent application Ser. No. 11/987,626 filed Dec. 3, 2007 and entitled "GPS-BASED SYSTEM AND METHOD FOR CONTROLLING VEHICLE CHARACTERISTICS BASED ON TERRAIN," in U.S. patent application Ser. No. 11/987,862 filed Dec. 5, 2007 and entitled "GPS-BASED TRACTION CONTROL SYSTEM AND METHOD USING DATA TRANSMITTED BETWEEN VEHICLES," or in U.S. patent application Ser. No. 11/987,769 filed Dec. 4, 2007 and entitled "GPS-BASED TRACTION CONTROL SYSTEM USING WIRELESSLY RECEIVED WEATHER DATA." The entire content of each of the foregoing applications is hereby incorporated by reference into the present application.

GPS subsystem 202 may be configured to transmit GPS data or one or more GPS signals to controller 106. The GPS data or signals can be sent to controller 106 in real time or not in real time. In various embodiments, the GPS data or signals can be received at an arbiter controller of the system 200. The GPS data or signals can represent any suitable GPS data or information, such as, one or more of the vehicle's location, longitude, latitude, speed, velocity, direction, attitude, altitude, and a time component associated with the vehicle. In various embodiments, GPS data may be correlated to a terrain map corresponding to the vehicle's real-time location. For example, longitude and/or latitude GPS data may be correlated to a terrain map indicative of the surface being traversed by the vehicle.

Weather subsystem 204 may be configured to transmit weather data or one or more weather signals to controller 106. The weather data or signals can be sent to controller 106 in real time or not in real time. In various embodiments, the weather data or signals can be received at an arbiter controller of the system 200. The weather data or signals can be correlated to GPS data corresponding to the vehicle's real-time location or position.

Optionally, controller 106 can be configured to define, choose, or select one of a brake-based stability control subsystem, a torque-based stability control subsystem, and a drivetrain-based stability control subsystem as the dominant stability control system based on the received GPS data or information. Alternatively, controller 106 may be configured define, choose, or select one of a brake-based stability control subsystem and a torque management-based stability control subsystem as the dominant stability control system based on the received GPS data or information. Important to note is that the controlling 106 can define, choose, or select one of the available stability control subsystems as dominant based only on the received GPS data or information. Other embodiments of the present invention contemplate defining, choosing, or selecting one of the available stability control subsystems as dominant based a combination of inputs to the controller 106, such as GPS data or information and current vehicle operating conditions data or signals; such as GPS data or information and data or signals from a traction control system; such as GPS data or information, current vehicle operating conditions data or signals, and data or signals from a traction control system.

System 200 can provide stability control based on the defined dominant stability control system substantially as described above for system 100, but with the additional factor of the GPS data or signals provided for defining, choosing, or selecting one of the available stability control subsystems as dominant, as discussed above. System 200 also can define, choose, or select one or more subordinate subsystems based on the dominant stability subsystem and/or based on inputs, such as current vehicle operating conditions, mobility keypad inputs, GPS data, and weather data.

Figure 3:
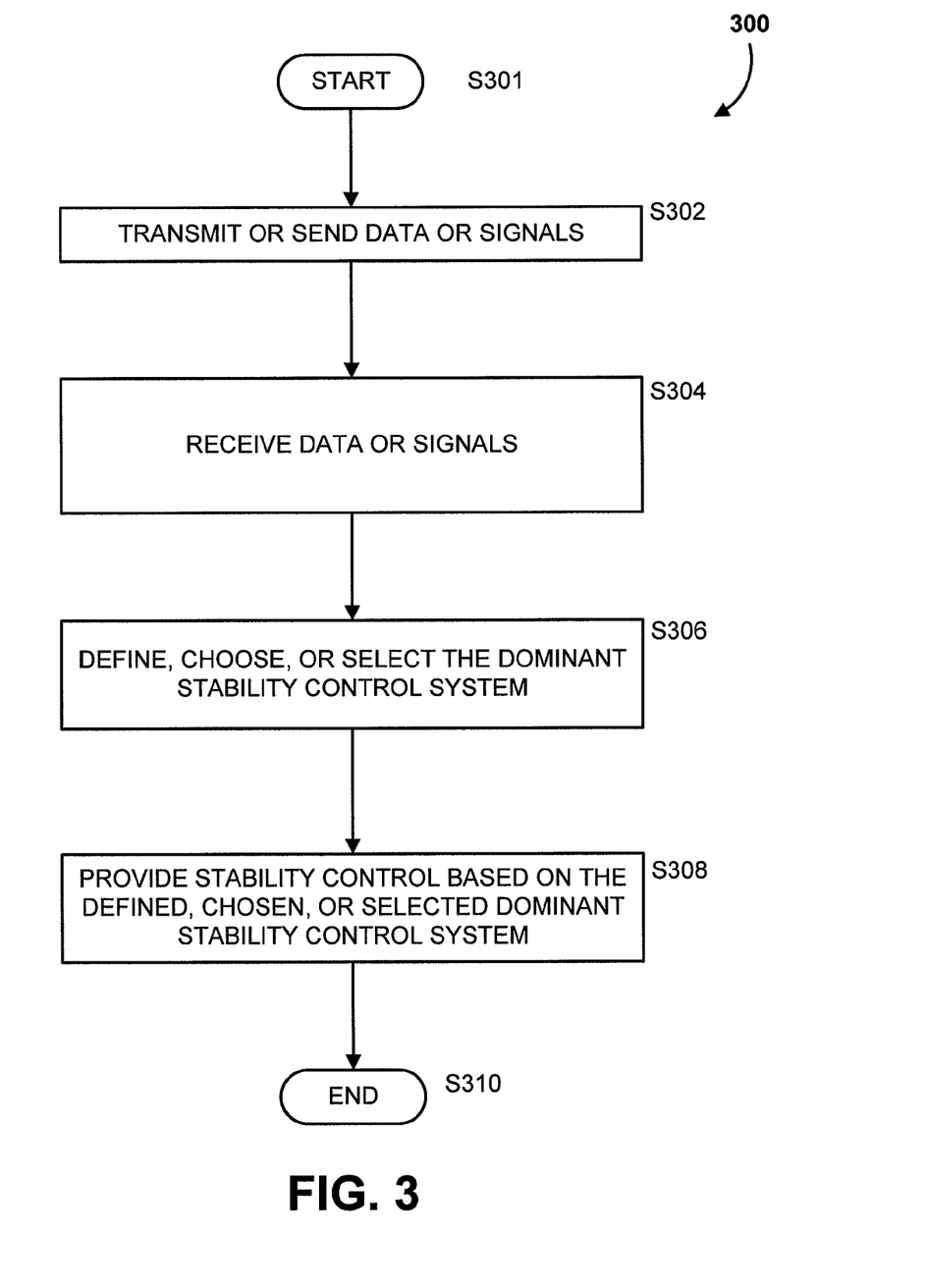
FIG. 3 is a flowchart illustrating an exemplary embodiment of a method in accordance with the present invention.

FIG. 3 shows a flow chart of a method 300 for stability control according to various embodiments of the present invention.

Method 300 can begin at S301 and proceed to any suitable step or operation. In various embodiments the method can proceed to S302.

S302 can be any suitable step or operation. In various embodiments, S302 can include transmitting or sending data or signals. The data or signals can be any suitable data or signals. Generally speaking, the data or signals transmitted or sent can be categorized into three major categories: (1) current vehicle operating conditions data or signals, such as a speed or velocity signal or data, a wheel speed signal or data, a height signal or data, a steering signal or data, a throttle signal or data, a roll/pitch/yaw signal or data, an acceleration signal or data, a brake pedal signal or data, and one or more current driving conditions signals or data; (2) data or signals from a mobility traction control system; and (3) GPS data or signals, such as the vehicle's location, longitude, latitude, speed, velocity, direction, attitude, altitude, and a time component associated with the vehicle. GPS data also may include weather data or signals. Any suitable combination of the three major categories may be transmitted for stability control. For example, data or signals from all three categories may be transmitted for stability control, or, optionally, data from only category three may be transmitted for stability control, or, optionally, data from only category three may be transmitted for stability control. Note that the foregoing examples are not exhaustive and any suitable combination or combinations are possible. Additionally, the signals and data can be transmitted in real time, substantially in real time, not in real time, or any combination thereof.

After S302, the method 300 can proceed to any suitable step or operation. In various embodiments, method 300 may proceed to S304.

S304 can be any suitable step or operation. In various embodiments, S304 can include receiving data or signals. In various embodiments, the received data or signals can be the same data or signals transmitted as discussed above in S302. In various embodiments, the signals or data can be received by controller 106. Optionally, the signals or data can be received by a state estimator of controller 106. The signals and data can be received in real time, substantially in real time, not in real time, or any combination thereof. S306 also can include defining, choosing, or selecting one or more subordinate subsystems for stability control. The defining, choosing, or selecting of subordinate subsystems may be based on the defined, chosen, or selected dominant stability control subsystem and/or the input signals or data described above as inputs to controller 106.

After S304, the method 300 can proceed to any suitable step or operation. In various embodiments, method 300 may proceed to S306.

S306 can be any suitable step or operation. In various embodiments, S306 can include defining, choosing, or selecting the dominant stability control system. In various embodiments, the defining, choosing, or selecting may be performed based on the received data or signals. As discussed above, the defining, choosing, or selecting may be one of a brake-based stability control subsystem, a torque-based stability control subsystem, and a drivetrain-based stability control subsystem. Optionally, the defining, choosing, or selecting may be one of a brake-based stability control subsystem and a torque management-based stability control subsystem. In various embodiments, controller 106 may perform the defining, choosing, or selecting. Optionally, a state estimator of controller 106 may perform the defining, choosing, or selecting. In various embodiments, only one stability control subsystem may be "on," operative, or enabled at a time.

After S306, the method 300 can proceed to any suitable step or operation. In various embodiments, method 300 may proceed to S308.

S308 can be any suitable step or operation. In various embodiments, S308 can include providing stability control based on the defined, chosen, or selected dominant stability control system. In various embodiments, controller 106 may provide the stability control. Optionally, an arbitration function of the controller 106 can provide the stability control. In various embodiments, the controller 106 or the arbitration function of the controller 106 can provide control signals to various ones of the vehicle's 100 subsystems to provide stability control. In various embodiments, providing stability control also can include providing active damping for the vehicle.

After S308, the method 300 can proceed to any suitable step or operation. In various embodiments, method 300 may proceed to S310 wherein the method ends.

Figure 4:
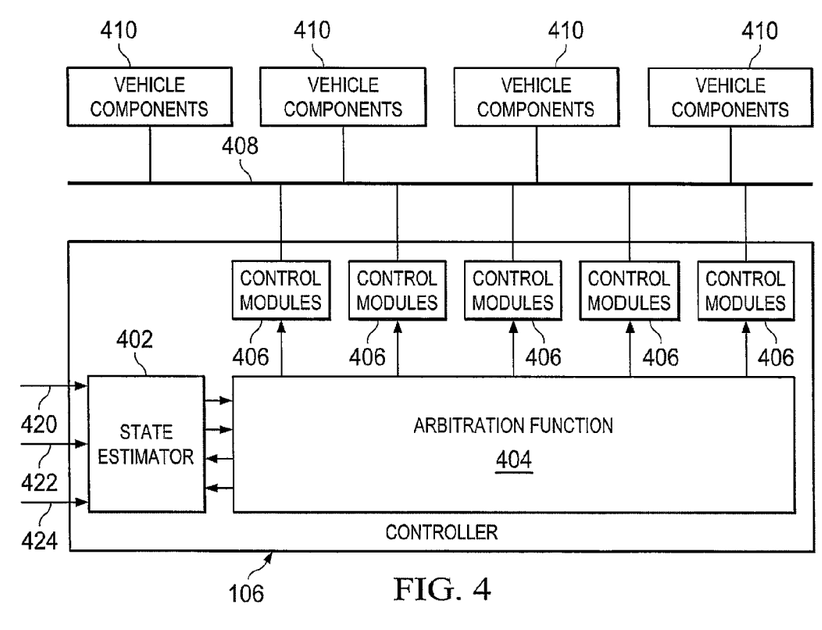
FIG. 4 is a block diagram representation of an exemplary embodiment of a controller and associated components according to the present invention.

FIG. 4 shows a block diagram representation of an exemplary embodiment of a controller 106 and associated components according to the present invention. Controller 106 can include any suitable components. In various embodiments, controller 106 can include a state estimator 402, an arbiter or arbitration function 404, and a plurality of control modules 406. In various embodiments, the arbitration function 404 may be implemented in state estimator 402. Furthermore, though not explicitly shown in FIG. 4, some or all of the inputs 420, 422, 424 to state estimator 402 may come from bus 408. Additionally, some of the inputs may come from on-board the controller 106, such as from an Inertial Measurement Unit (IMU), which can send roll, pitch, yaw signals and acceleration signals, for example.

State estimator 402 can be of any suitable configuration and can be implemented in hardware, software, or combination thereof. In various embodiments, state estimator 402 may be configured to receive one or more inputs. The inputs can be any suitable inputs, such as signals or data as described above. For example, the data or signals received at state estimator 402 can be based on three major categories: (1) current vehicle operating conditions data or signals, such as a speed or velocity signal or data, a height signal or data, a steering signal or data, a throttle signal or data, a roll/pitch/yaw signal or data, an acceleration signal or data, and one or more current driving conditions signals or data can be input at 420; (2) data or signals from a mobility traction control system can be input at 422; and (3) GPS data or signals, such as the vehicle's location, longitude, latitude, speed, velocity, direction, attitude, altitude, and a time component associated with the vehicle can be input at 424. GPS data also may include weather data. Note that although FIG. 4 shows only three inputs, each of the three inputs shown may represent a plurality of inputs to arbiter controller 402. Furthermore, as will be discussed later, state estimator 402 may also receive as an input, signals or data from a trailer physically and/or electrically coupled to the vehicle. The signals or data from the trailer may represent current operating conditions of the trailer. Moreover, the trailer signals or data may be used to determine which stability control subsystem is dominant to provide for stability control of the vehicle and of the trailer.

The state estimator 402 can be configured to receive one or more of the signals or data discussed above and define, choose, or select a stability control subsystem as the dominant stability control subsystem for the vehicle. The dominant stability subsystem may be continually updated based on the received signals or data. Moreover, the state estimator 402 can define or choose or select the dominant stability control subsystem by any suitable means, such as by use of hardware, software, or combination thereof specific to the particular configuration of the vehicle 102 and system 100 or 200.

Once the state estimator 402 has defined, chosen, or selected the dominant stability control subsystem for the vehicle, an indication of the result is outputted. In various embodiments, the indication is supplied to an arbitration function 404 of the controller 106.

Arbitration function 404 can be of any suitable configuration and can be implemented in hardware, software, or combination thereof. Arbitration function 404 may implement a control function to control stability of the vehicle. In various embodiments, the arbitration function 404 outputs control or command signals to one or more of the control modules 406 to provide stability control for the vehicle. Control modules 406, in turn, may supply command or control signals to associated components 410 of the subsystem to which they are associated. In various embodiments, control modules 406 may send command or control signals via a J1939 bus. Arbitration function 404 also may provide one or more feedback signals to the state estimator 402. Control modules 406 can be any suitable modules, such as an engine control module, a brake control module, a torque control module, a shock control module, a height control module, etc. Optionally, the control modules 406 may not be part of the controller 106, but instead are coupled thereto.

As an example of how the arbitration function may control vehicle stability, say, for instance that the state estimator has determined that a driveline torque management stability control system is dominant. When this system is dominant, for example, there may be certain things that the system does not want to happen or occur. For example, when the driveline torque management stability control system is dominant and torque is being modified (e.g., increased or decreased), the system may not want to allow a braking feature to be partially or fully implemented. Thus, the system could control the brake system such that it is disabled or such that its status or state does not change, or can only change by a predetermined amount. Note that the foregoing is only an example, and the arbitration function 404 can provide vehicle stability control in any suitable means.

For another example, inputs may include a wheel speed signal, a steering position signal, a vehicle height signal, a GPS signal, a yaw rate signal, and a roll rate signal. Based on the values of the inputs, some or all of which may be compared to predetermined values, the system and method can determine that stability control needs to take place. The system and method can define, choose, or select a dominant control subsystem for control (torque-based stability control in this case), and can provide as outputs for stability control, a signal to disable brake-based stability control, a signal to increase torque to inside wheels of the vehicle (assuming the vehicle is turning), and a signal to increase damping on outside shocks. The foregoing may be actions taken for an "off-road oversteer" condition.

Another example includes inputs of a wheel speed signal, a steering position signal, a vehicle height signal, a GPS signal, a yaw rate signal, and a roll rate signal. Based on the values of the inputs, some or all of which may be compared to predetermined values, the system and method can determine that stability control needs to take place. The system and method can define, choose, or select a dominant control subsystem for control (torque-based stability control in this case), and can provide as outputs for stability control, a signal to disable brake-based stability control, a signal to increase torque to outside wheels of the vehicle (assuming the vehicle is turning), and a signal to stiffen damping on outside shocks. The foregoing may be actions taken for an "off-road understeer" condition.

Yet another example includes inputs of a wheel speed signal, a steering position signal, a vehicle height signal, a GPS signal, a yaw rate signal, and a roll rate signal. Based on the values of the inputs, some or all of which may be compared to predetermined values, the system and method can determine that stability control needs to take place. The system and method can define, choose, or select a dominant control subsystem for control (brake-based stability control in this case), and can provide as outputs for stability control, a signal to disable torque-based stability control (e.g., torque vectoring stability control), apply brake to left front, and increase damping on outside shocks. The foregoing may be actions taken for an "on-road oversteer" condition.

Figure 5:
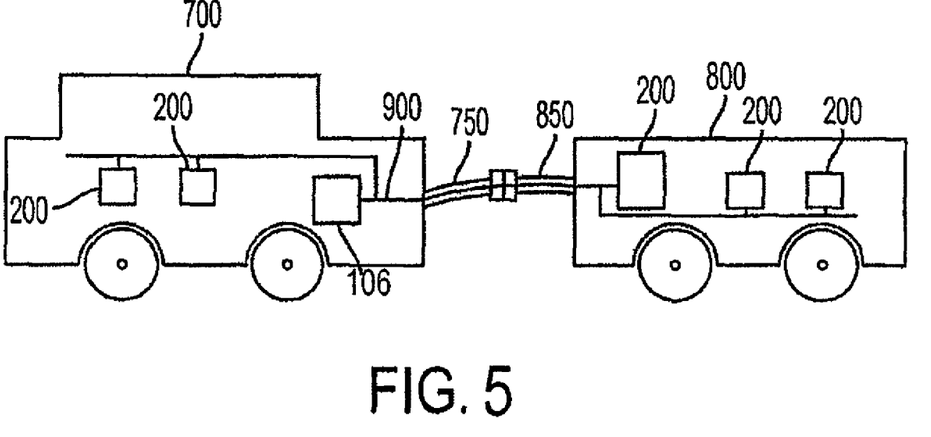
FIG. 5 is a block diagram representation of a stability system for a vehicle and trailer according to various embodiments of the present invention.

Embodiments of the present invention also contemplate arbitration between a driven vehicle (e.g., a truck) and a trailer physically and electronically coupled to the driven vehicle. Turning to FIG. 5, FIG. 5 shows a vehicle 700 and a trailer 800. As can be seen, the vehicle 700 and trailer 800 are physically and electronically coupled together. In various embodiments, the electronic coupling may be via a J1939 bus 900 and the physical coupling can be via physical links 750 and 850. Note that vehicle 700 may be substantially the same as the vehicle 102 in FIGS. 1 and 2. For the vehicle 700 and trailer 800 in FIG. 5, stability control may be provided for both the vehicle 700 and the trailer 800. Optionally, stability control may be provided for the vehicle 700 and the trailer 800 simultaneously. In various embodiments, stability control can be provided based on the dominant stability control system defined, chosen, or selected. For example, controller 106 can received vehicle operating signals or data from subsystems 200. Controller 106 also can receive trailer operating signals or data from subsystems 200 of trailer 800 via the J1939 bus. The operating conditions of vehicle 700 can be substantially as those described previously. Similarly, operating conditions of trailer 800 can include a speed or velocity signal, a height signal, a roll/pitch/yaw signal, and one or more current trailer driving condition signals.

Embodiments of the system of method for stability control for both vehicle 700 and trailer 800 also can include defining, choosing, or selecting one of a brake-based stability control subsystem, a torque-based stability control subsystem, and a drivetrain-based stability control subsystem as the dominant stability control system for the wheeled tactical vehicle based on the received signals associated with current vehicle operating conditions and based on the received signals associated with current trailer operating conditions. Based on the defined dominant stability control system, controller 106 may provide stability control of the vehicle 700 and for the trailer 800 coupled to the wheeled tactical vehicle. Embodiments also include either activating or not activating a dominant stability control subsystem in the trailer. Thus, embodiments can include choosing a dominant stability control subsystem in the vehicle and providing stability control for the vehicle and/or for the trailer accordingly; choosing a dominant stability control subsystem in the vehicle and in the trailer, and providing stability control for both accordingly; and choosing a dominant stability control subsystem in the trailer and providing stability control for the trailer accordingly.

Optionally, embodiments of the system of method for stability control for both vehicle 700 and trailer 800 also can include a signal associated with a mobility traction control system including a mobility keypad, the signal from the mobility traction control system being indicative of a traction mode of the vehicle selected by a user via the mobility keypad. Accordingly, the system and method may define, select, or choose the dominant stability control system based on this additional input, as well as the operating conditions of the vehicle 700 and trailer 800 to provide stability control for the vehicle 700 and for the trailer 800.

Optionally, vehicle operating data or signals may also represent GPS data or signals. As such, the system and method may define, select, or choose the dominant stability control system based on this additional input, as well as other operating conditions of the vehicle 700, operating conditions of the trailer 800, and data or signals from a traction control subsystem to provide stability control for the vehicle 700 and for the trailer 800.

It should be appreciated that any steps described above may be repeated in whole or in part in order to perform a contemplated stability control task. Further, it should be appreciated that the steps mentioned above may be performed on a single or distributed processor. Also, the processes, elements, components, modules, and units described in the various figures of the embodiments above may be distributed across multiple computers or systems or may be co-located in a single processor or system.

Embodiments of the method, system and computer program product (i.e., software) for stability control, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for stability control.

Furthermore, embodiments of the disclosed method, system, and computer program product for stability control may be readily implemented, fully or partially, in software using, for example, object or object-oriented software development environments that provide portable source code that can be used on a variety of computer platforms. Alternatively, embodiments of the disclosed method, system, and computer program product for stability control can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for stability control can be implemented in hardware and/or software using any known or later developed systems or structures, devices and/or software by those of ordinary skill in the applicable art from the functional description provided herein and with a general basic knowledge of the computer arts.

Moreover, embodiments of the disclosed method, system, and computer program product for stability control can be implemented in software executed on a programmed general-purpose computer, a special purpose computer, a microprocessor, or the like. Also, the stability control systems and methods can be implemented as a program embedded on a personal computer such as a JAVA® or CGI script, as a resource residing on a server or graphics workstation, as a routine embedded in a dedicated processing system, or the like. The methods and systems can also be implemented by physically incorporating the methods for providing or presenting data into a software and/or hardware system, for example a computer software program.

It is, therefore, apparent that there is provided in accordance with the present invention, a method, system, and computer program product for stability control. While this invention has been described in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of this invention.

What is claimed is:

1. A method for electronic stability control of a wheeled tactical vehicle and a trailer coupled to the wheeled tactical vehicle, the electronic stability control method comprising:
receiving substantially in real time at a state estimator of a vehicle arbiter controller, signals associated with current vehicle operating conditions, the current vehicle operating conditions signals including three or more of a wheel speed signal, a velocity signal, a height signal, a steering signal, a throttle signal, a roll/pitch/yaw signal, an acceleration signal, a brake pedal signal, and an active damper signal;
receiving substantially in real time at the state estimator of the vehicle arbiter controller, signals associated with current trailer operating conditions, the current trailer operating conditions signals including three or more of a wheel speed signal, a velocity signal, a height signal, a roll/pitch/yaw signal, and a tongue angle signal;
receiving at the state estimator of the vehicle arbiter controller a signal associated with a mobility traction control system including a mobility keypad, the signal from the mobility traction control system being indicative of a traction mode of the wheeled tactical vehicle selected by a user via the mobility keypad;
providing a brake-based stability control subsystem, a torque-based stability control subsystem, and a drivetrain-based stability control subsystem;
selecting one of the brake-based stability control subsystem, the torque-based stability control subsystem, and the drivetrain-based stability control subsystem as the dominant stability control system for the wheeled tactical vehicle based on the three or more received signals associated with current vehicle operating conditions, the three or more received signals associated with current trailer operating conditions, and the received signal associated with the mobility traction control system; and
providing stability control of the wheeled tactical vehicle and for the trailer coupled to the wheeled tactical vehicle based on the selected dominant stability control subsystem, while disabling the stability control subsystems not selected as dominant.

2. The method of claim 1, wherein the selecting is responsive to one or more of a trailer weight, a trailer center of gravity, a trailer tire pressure, a surface upon which the trailer is positioned, and a slope of the trailer.

3. The method of claim 1, wherein said selecting includes providing a choice of the brake-based stability control subsystem, the torque-based stability control subsystem, and the drivetrain-based stability control subsystem for selecting as the dominant stability control system.

4. The method of claim 1, further comprising selecting one or more subordinate subsystems of the wheeled tactical vehicle, and selecting one or more subordinate subsystems of the trailer.

5. A system for stability control of a tactical vehicle and a trailer physically and electrically coupled thereto, the system comprising:
first receiving means for receiving three or more of a velocity signal of the tactical vehicle, speed signals from each wheel of the tactical vehicle, a height signal associated with the tactical vehicle, a steering signal associated with the tactical vehicle, a throttle signal associated with the tactical vehicle, a roll/pitch/yaw signal associated with the tactical vehicle, a brake pedal signal, an active damping signal, and at least one signal associated with a current driving condition of the tactical vehicle;
second receiving means for receiving a signal from a traction control system, the signal from the traction control system being indicative of a traction mode of the tactical vehicle selected by a user;
third receiving means for receiving three or more of a wheel speed of the trailer, a velocity signal of the trailer, a height signal of the trailer, a roll/pitch/yaw signal of the trailer, a trailer tongue angle, and at least one signal associated with current driving condition of the trailer;
processing means for defining one of a brake-based stability control subsystem and a torque management-based stability control subsystem as the dominant stability control system of the tactical vehicle based on the signals received by said first, second, and third receiving means; and
controlling means for providing stability control of the tactical vehicle and of the trailer based on the defined dominant stability control system.

6. The system of claim 5, further comprising damping means for providing active damping for the tactical vehicle in response to a control signal received from said controlling means.

7. The system of claim 5,
wherein the at least one current driving condition signal of the tactical vehicle represents one or more of a vehicle weight, a vehicle center of gravity, a vehicle tire pressure, a surface upon which the tactical vehicle is riding, and a slope of the vehicle, and
wherein the at least one signal associated with current driving condition of the trailer represents one or more of a trailer weight, a trailer center of gravity, a trailer tire pressure, a surface upon which the trailer is riding, and a slope of the trailer.

8. The system of claim 5, wherein said processing means for defining one of the brake-based stability control subsystem and the torque management-based stability control subsystem as the dominant stability control system includes providing a selection between the brake-based stability control subsystem and the torque management-based stability control subsystem.

9. The system of claim 5,
wherein said processing means includes a state estimator, and
wherein said controlling means includes an arbitration function.

10. A method for stability control of a wheeled vehicle and a trailer coupled thereto comprising:
receiving at a controller, data associated with current vehicle operating conditions;

receiving at the controller, data associated with current trailer operating conditions;

providing a plurality of stability control subsystems for the wheeled vehicle, the plurality including at least a brake-based stability control subsystem and a torque management-based stability control subsystem;

responsive to said received data associated with current vehicle operating conditions and said received data associated with current trailer operating conditions, automatically selecting one of the plurality as dominant; and providing stability control of the wheeled vehicle and the trailer using the automatically selected dominant stability control system.

11. The method of claim 10, wherein said providing stability control further includes providing active damping for the wheeled vehicle.

12. The method of claim 10, wherein said data associated with vehicle operating conditions include a wheel speed signal, a velocity signal, a height signal, a steering signal, a throttle signal, a roll/pitch/yaw signal, an acceleration signal, a GPS signal, a brake pedal signal, and at least one current driving condition signal.

13. The method of claim 12,
wherein the at least one current driving condition signal includes one or more of a vehicle weight, a vehicle center of gravity, a vehicle tire pressure, and a surface upon which the wheeled vehicle is riding, and
wherein the at least one signal associated with current driving condition of the trailer represents one or more of a trailer weight, a trailer center of gravity, a trailer tire pressure, a surface upon which the trailer is riding, and a slope of the trailer.

14. The method of claim 10, further comprising determining which of a plurality of subsystems to invoke as subordinate based on the received data associated with current vehicle operating conditions and the received data associated with current trailer operating conditions.

15. The method of claim 10, further comprising receiving at the controller a signal from a mobility traction control system including a mobility keypad, the signal from the mobility traction control system being indicative of a traction mode of the wheeled vehicle selected by a user via the mobility keypad, wherein said automatically selecting is further based on said received signal from a mobility traction control system.

16. The method of claim 10, wherein said providing stability control includes sending output signals from the controller to one or more vehicle subsystems via a J1939 bus.

17. The method of claim 10,
wherein said automatically selecting is performed by a state estimator of the arbiter controller, and
wherein said providing stability control includes an arbitration function.

18. The method of claim 10, further comprising receiving at the controller GPS data, wherein said automatically selecting is further based on said received GPS data.

19. The method of claim 10, further comprising receiving at the controller weather data, wherein said automatically selecting is further based on said received weather data.

20. The method of claim 19, wherein said received weather data is based on GPS data for the wheeled vehicle.

* * * * *